United States Patent
Meehan

(10) Patent No.: US 8,803,917 B2
(45) Date of Patent: *Aug. 12, 2014

(54) COMPUTER-IMPLEMENTED SYSTEM AND METHOD FOR A VIRTUAL OBJECT RENDERING BASED ON REAL WORLD LOCATIONS AND TAGS

(71) Applicant: Groundspeak, Inc., Seattle, WA (US)

(72) Inventor: Patrick Carson Meehan, Seattle, WA (US)

(73) Assignee: Groundspeak, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,671

(22) Filed: Aug. 5, 2013

(65) Prior Publication Data

US 2013/0314407 A1 Nov. 28, 2013

Related U.S. Application Data

(63) Continuation of application No. 12/875,049, filed on Sep. 2, 2010, now Pat. No. 8,502,835.

(60) Provisional application No. 61/239,361, filed on Sep. 2, 2009.

(51) Int. Cl.
G06T 19/00 (2011.01)

(52) U.S. Cl.
USPC .......................................... 345/633

(58) Field of Classification Search
USPC .......................................... 345/633
See application file for complete search history.

(56) References Cited

U.S. PATENT DOCUMENTS

| | | | |
|---|---|---|---|
| 6,691,032 B1 * | 2/2004 | Irish et al. | 701/487 |
| 6,961,629 B2 | 11/2005 | Fukui et al. | |
| 6,988,010 B2 | 1/2006 | Taniguchi et al. | |
| 7,366,987 B2 | 4/2008 | Taniguchi et al. | |
| 7,453,471 B2 | 11/2008 | Fukui et al. | |

(Continued)

FOREIGN PATENT DOCUMENTS

WO WO 2009040093 4/2009

OTHER PUBLICATIONS

Thomas et al., "First Person Indoor/Outdoor Augmented Reality Application: ARQuake," Feb. 2002, Springer-Verlag, Personal and Ubiquitous Computing, vol. 6, Issue 1, pp. 75-86.*

(Continued)

Primary Examiner — Kee M Tung
Assistant Examiner — Ryan D McCulley
(74) Attorney, Agent, or Firm — Patrick J. S. Inouye; Krista A. Wittman; Makiko Coffland

(57) ABSTRACT

A computer-implemented system and method for rendering a virtual object based on real world locations and tags are provided. A set of virtual objects is maintained in an actions database on a mobile computing device. Each virtual object is associated with pairings of identifiers and coordinates for one or more physical locations. A physical location of the mobile computing device is tracked and also an identification tag within range of the mobile computing device is identified. The virtual object is identified as at least one of the pairings of coordinates and identifiers that match the physical location and the identification tag. Then, the virtual object is rendered using the mobile computing device based on the matching of the pairings.

18 Claims, 4 Drawing Sheets

(56) References Cited

U.S. PATENT DOCUMENTS

| | | |
|---|---|---|
| 7,890,582 B2 | 2/2011 | Im et al. |
| 2004/0103374 A1 | 5/2004 | Chishima |
| 2007/0035563 A1 | 2/2007 | Biocca et al. |
| 2007/0180979 A1 | 8/2007 | Rosenberg |
| 2008/0150965 A1 | 6/2008 | Bischoff et al. |
| 2008/0252527 A1 | 10/2008 | Garcia |
| 2008/0293488 A1 | 11/2008 | Cheng et al. |
| 2009/0129630 A1 | 5/2009 | Gloudemans et al. |
| 2010/0066750 A1 | 3/2010 | Yu et al. |
| 2010/0185529 A1 | 7/2010 | Chesnut et al. |
| 2010/0287511 A1 | 11/2010 | Meier et al. |

OTHER PUBLICATIONS

Jonsson et al., "The Art of Game-Mastering Pervasive Games," Dec. 2008, ACM, International Conference on Advances in Computer Entertainment Technology, pp. 224-231.*

* cited by examiner

Fig. 2.
| Action | ID | Location |
|---|---|---|
| -present virtual object of a grail with a clue | 1423 | 47°37'13.98"N 122° 20'58.11"W |
| -present a riddle | 1423 | |
| -present a virtual object of a billboard providing informational data | 1424 | 38.89767° N 77.03655° W |
Fig. 3A.
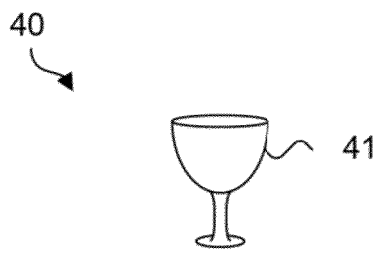
Fig. 3B.
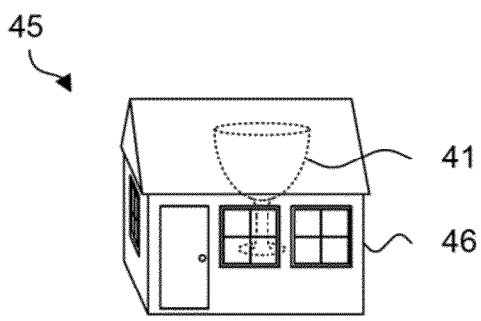

COMPUTER-IMPLEMENTED SYSTEM AND METHOD FOR A VIRTUAL OBJECT RENDERING BASED ON REAL WORLD LOCATIONS AND TAGS

CROSS-REFERENCE TO RELATED APPLICATION

This non-provisional patent application is a continuation of U.S. Pat. No. 8,502,835, issued Aug. 6, 2013, which claims priority under 35 U.S.C. §119(e) to U.S. Provisional Patent application Ser. No. 61/239,361, filed Sep. 2, 2009, the priority filing dates of which are claimed, and the disclosures of which are incorporated by reference.

FIELD

The invention relates in general to augmented reality provisioning and, specifically, to a system and method for a virtual object rendering based on real world locations and tags.

BACKGROUND

An augmented virtual reality combines real world attributes, such as physical position or user movement, with computer-generated, often visual, data. Together, the real world attributes and the computer-generated data form a user experience occurring in a virtualized space as influenced by real world inputs, typically co-occurring in real time, and actions, often performed by the user.

In general, augmented realities are presented visually through graphical user interfaces, which can also be supplemented with auditory cues, tactile feedback, and other computer-generated outputs. Thus, the user is immersed into a virtual reality by feeding sensory data via the computer-generated data that changes in response to user actions or other real world inputs, such as noises, movement, lighting conditions, time of day, or radio or cellular signals.

Recently, the capabilities of mobile platforms, such as portable media players, personal data assistants (PDA), and mobile telephones, have grown to enable on-the-go generation of augmented realities. Users are no longer tied to desktop environments and the physical constraints imposed by having to remain in a relatively stationary position. Moreover, these platforms are increasingly being equipped with input capabilities extending beyond the immediate user interface. For instance, mobile telephones often incorporate built-in cameras and global positioning system (GPS) receivers, the latter of which enables the device to determine the user's physical location. Similarly, portable media players are beginning to incorporate motion sensors that sense directional device orientation.

To a limited degree, existing devices used in augmented reality rendering have attempted to model virtual objects within the immediacy of the user, but have failed to adequately account for inanimate objects, such as walls or similar fixtures, which may obscure or block viewing of the virtual reality object. For instance, U.S. Patent Publication No. US 2008/0150965, published Jun. 26, 2008 to Bischoff et al. discloses a method and device for determining optical overlaps with augmented reality objects. Bischoff rejects the use of stored overlap models due to calibration or recording errors, and instead relies on a video image and a depth image recorded simultaneously. Augmented reality objects are processed to appear correctly in size and position. Each processed augmented reality object is supplied to a video mixer for overlaying in the environmental image, which is supplied to a monitor or screen, so a user can see an augmented reality image with superimposition of the real environment and the augmented reality object. However, Bischoff can only simulate virtual object superimposition for an environment within physical range of the video and depth imaging equipment.

U.S. Patent Publication No. US 2008/0293488, published Nov. 27, 2008 to Cheng et al. discloses an electronic game utilizing two-dimensional photographs. A three-dimensional path for a virtual object is determined relative to a topological model of the physical terrain for a physical course, such as a golf course. A plurality of areas of the physical course are captured by the photographic images. A sequence of one or more of the photographic images having a view of the physical course areas on or about the virtual object's path are selected to provide players the experience of playing on a real course. However, Cheng simulates the path of the virtual object while moving forward through the physical course, rather than as blocked by real world objects present in the path.

U.S. Patent Publication No. US 2008/0252527, published Oct. 16, 2008 to Garcia discloses a method and apparatus for acquiring local position and overlaying information. The local relative positions of other objects are acquired by detecting wireless signals indicating the presence of radio frequency beacons within an area of influence and further acquiring positioning by integrating sensor data, such as vectors of movement of each object, local object information, and device orientation. Local relative position acquisition is provided by feeding sensor data into a positioning and filtering algorithm and each object is assigned a relative coordinate with the area of influence. Directional objects can be programmed through a direction routing table, which describes the compass direction from a given location. However, object overlap is not computed.

Finally, U.S. Patent Publication No. US 2009/0129630, published May 21, 2009 to Gloudemans et al. discloses three-dimensional textured objects for virtual viewpoint animations. An image of an event is obtained from a camera and an object in the image is automatically detected. A three-dimensional model of the object is combined with a textured three-dimensional model of the event to depict a virtual viewpoint, which differs from the viewpoint of the camera used to view the event. However, the virtual viewpoint, including any overlap of the three-dimensional textured objects, is limited by the physical range of the camera.

Therefore, a need remains for a non-imagery-based approach to generating spatially correct three-dimensional augmented reality renderings of virtual objects with overlap and positioning properly depicted relative to an immediate real world environment not reliant upon limitations of real world imagery processing.

SUMMARY

A system and method for rendering a virtual object based on real world locations and tags are provided. A mobile computing platform that is capable of self-position sensing identifies a physical identification tag, which is combined with physical location information. Platform-performable actions, such as displaying of graphical objects, playing of auditory cues, or generating tactile feedback, are stored in an onboard actions database. Each action is associated with a predetermined identification tag and one or more physical locations, such as defined by geolocational data.

One embodiment provides a computer-implemented system and method for rendering a virtual object based on real world locations and tags. A set of virtual objects is maintained in an actions database on a mobile computing device. Each virtual object is associated with pairings of identifiers and coordinates for one or more physical locations. A physical location of the mobile computing device is tracked and also an identification tag within range of the mobile computing device is identified. The virtual object is identified as at least one of the pairings of coordinates and identifiers that match the physical location and the identification tag. Then, the virtual object is rendered using the mobile computing device based on the matching of the pairings.

A further embodiment provides a computer-implemented method for performing an augmented reality scenario with a virtual object rendering based on real world locations and tags. A scenario is defined. An identifier is placed at a plurality of physical locations. Virtual objects associated with the identifier and coordinates for the physical location of the action are defined. All of the virtual objects are assembled into an actions database. The scenario is performed through a mobile computing device. A physical location of the mobile computing device is tracked. An identification tag within range of the mobile computing device is identified. A virtual object with at least one of the pairings of coordinates and identifiers that match the physical location and identification tag is identified. Then, the virtual object is rendered using the mobile computing device based on the matching of the pairings.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 2 is a block diagram showing, by way of example, action records as stored in the actions databases of FIG. 1.

FIGS. 3A and 3B are diagrams respectively showing, by way of example, a virtual object and the virtual object as rendered relative to a real world object.

DETAILED DESCRIPTION

Figure 1:
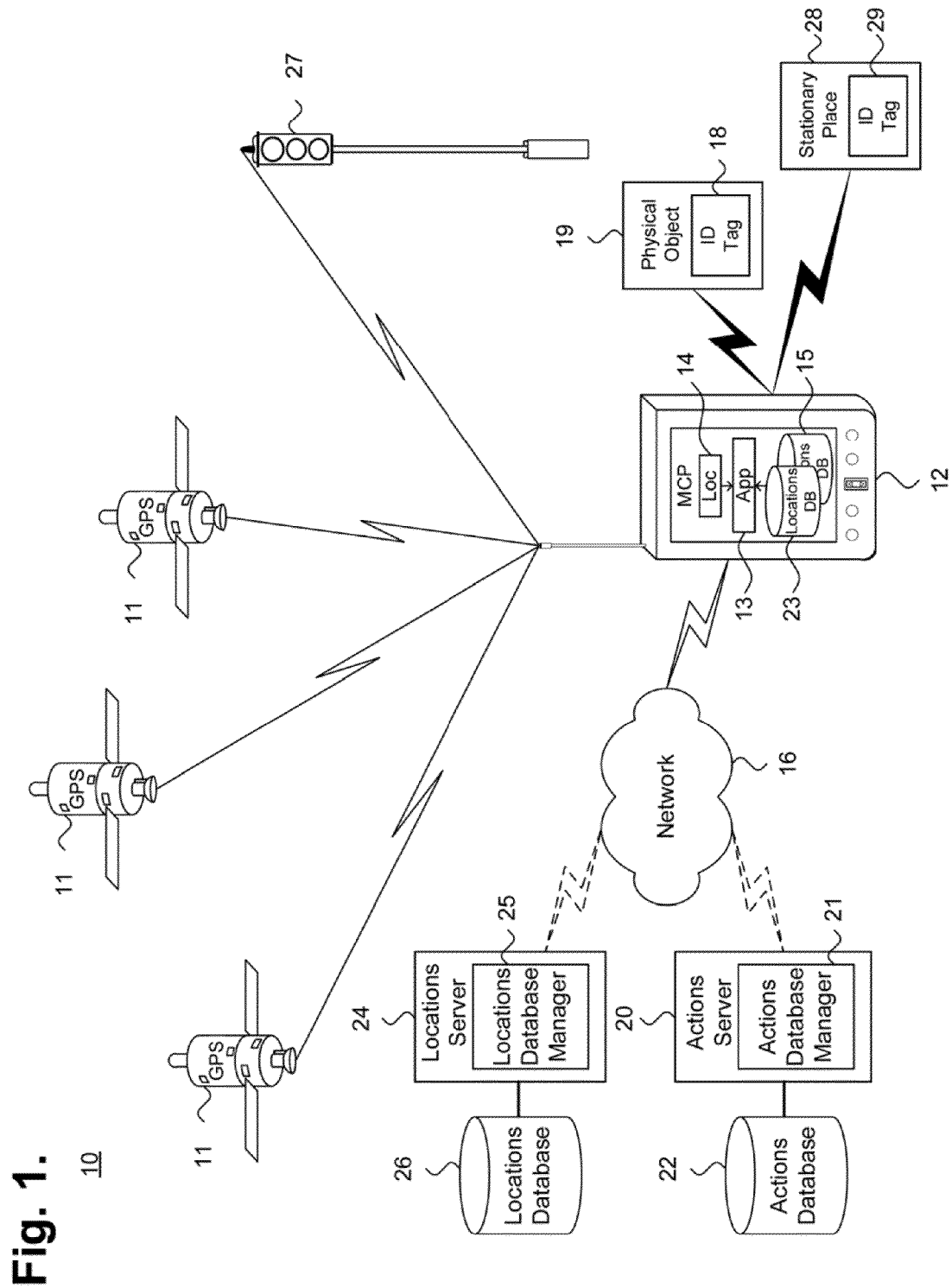
FIG. 1 is a functional block diagram showing a system for simulating placement of a virtual object relative to real world objects in accordance with one embodiment.

Identification tags and physical location information, both determined locally and on-the-fly by a mobile computing platform, are dynamically combined to trigger performance of an action, which contributes to an augmented reality user experience. Additionally, a database of models of real world objects is evaluated when the action includes rendering of a virtual object, and the rendering is adjusted as appropriate relative to any real world object "blocking" or "obscuring" the virtual object. FIG. 1 is a functional block diagram showing a system for simulating placement of a virtual object relative to real world objects in accordance with one embodiment. The system 10 operates in accordance with a sequence of process steps, as further described below beginning with reference to FIG. 4.

Each user operates a mobile computing platform (MCP) 12, such as a portable media player, personal data assistant (PDA), portable video game console, or mobile telephone. Other types of MCPs are possible. The MCP 12 executes an application program ("app") 13, which can be implemented through software, firmware, or hardware for execution locally on the MCP 12. In one embodiment, the application 13 includes a downloadable cartridge written as an executable script that defines triggerable events, such as described in commonly-assigned U.S. Pat. No. 6,691,032 to Irish et al., the disclosure of which is incorporated by reference. Other forms of application programs are possible.

The application 13 receives two dynamically-determined input parameters, physical location information ("loc") 14 and an identification tag 18. The physical location information 14 and identification tag 18 are paired and compared to data stored in an onboard actions database 15. The actions database 15 stores predetermined associations between pairings of physical locations and identification tags and actions that contribute to a three-dimensional augmented reality user experience, as further described below with reference to FIG. 2. If a match between the physical location information 14 and identification tag 18 pairing and one of the predetermined associations in the database is made, the corresponding action is checked for any virtual object renderings, which are each compared to data stored in an onboard locations database 23. The locations database 23 stores models of real world objects, as further described below with reference to FIGS. 3A and 3B. If applicable, position and overlap of the virtual object are rendered in relation to each real world object affected using their corresponding model and the corresponding action is performed by the MCP 12.

The MCP 12 is capable of self-position sensing in generating the physical location information 14 using, for instance, a GPS receiver, or with reference to a stationary data marker or beacon 27, such as a radio frequency signal. In general, GPS receivers interpret signals received from an orbiting constellation of GPS satellites 11, which transmit locational signals that are triangulated into geolocational data, while a stationary data maker or beacon 27 transmits the geolocational data for its own position. In one embodiment, the MCP 12 determines its own location from geolocational data, minimally consisting of latitude and longitude or similar coordinates. GPS satellite-originated geolocational data is determined from either a standalone GPS receiver attached via a conventional cable to the MCP 12 or GPS receiver components incorporated into the MCP 12 itself. In a further embodiment, stationary data marker or beacon-originated geolocational data is determined from a wireless receiver, which includes beacons broadcast via radio, cellular telephone, wireless fidelity ("Wi-Fi"), Bluetooth, or other types of wireless communication signals. In a still further embodiment, the MCP 12 receives the physical location information 14 via manual user input through the MCP's user interface.

The MCP 12 also is capable of identifying identification tags 18, 29, as respectively found on a physical object 19, which can include a movable physical item, or stationary place 29. The identification tags 18, 29 can be embedded, placed upon, or otherwise attached to or associated with the physical object 19 or stationary place 29. The identification tags 18, 29 can be passive, that is, physically visible, such as a bar code, grid, image tag, or number sequence, or active, such as provided through wireless communications, such as a transmitted radio frequency identification (RFID) tag. The MCP 12 includes recognition software or hardware to identify or decode each identification tag 18, 29. Each identification tag 18, 29 can be unique or the same as other identification tags, as the combination of an identification tag 18, 29 and the physical location information 14 will generally be sufficient to distinctively identify the physical object 19 or stationary place 29. In a further embodiment, the MCP 12 receives the data for the identification tag 18, 29 via manual user input through the MCP's user interface.

In a still further embodiment, the MCP 12 is also network-capable and can interface with other devices over a network 16, for instance, an internetwork, such as the Internet, or other distributed data communications channel, including open or proprietary wired, wireless, satellite, or other forms of data communication. In addition, an actions database 22 can be provided remotely through an actions database manager 21 executing on an actions server 20 accessible via the network 16. Similarly, a locations database 26 can be provided remotely through a locations database manager 25 executing on a locations server 24 accessible via the network 16. Either or both of the actions database 22 and the locations database 26 can respectively be either in addition to or in lieu of the actions database 15 and the locations database 23 maintained locally by each MCP 12.

The individual computer systems, including the actions server 20 and the locations server 24, include general purpose, programmed digital computing devices consisting of a central processing unit (CPU), random access memory (RAM), non-volatile secondary storage, such as a hard drive or CD ROM drive, network or wireless interfaces, and peripheral devices, including user interfacing means, such as a keyboard and display. Mobile computing platforms include comparable components adapted to portable use and, where applicable, particularized applications, such as digital media playback or mobile communications. In general, program code, including software programs, and data is loaded into the RAM for execution and processing by the CPU and results are generated for display, output, transmittal, or storage.

The actions database stores associations between pairings of physical locations and identification tags and actions. FIG. 2 is a block diagram showing, by way of example, action records 30 as stored in the actions databases 15, 22 of FIG. 1. The actions database is columnarly-organized into action 31, identification tag 32, and physical location 33 entries. Other columns are possible. Each individual record 34 associates an action entry 31 with a pairing of identification tag 32 and physical location 33 entries.

Each action entry 34 can specify a virtual object that will be rendered through a display provided on or visualization hardware interconnected with the MCP 12, such as described in commonly-assigned U.S. patent application, entitled "System and Method for Providing a Virtual Object based on Physical Location and Tagging," Ser. No. 12/852,366, filed Aug. 6, 2010, pending, the disclosure of which is incorporated by reference. The rendering of the virtual object contributes to a three-dimensional augmented reality user experience. Additionally, action entries 34 can include displayed text, visualized images or scenes, auditory sounds, tactile feedback, and the like, as supportable through the capabilities of the MCP 12 or in conjunction with an affiliated device or hardware that is functionally coupled to the MCP 12, such as virtual reality display goggles, LCD projectors headphones, speakers, or haptic technologies, as well as the server 20.

The augmented reality space is considered three-dimensional by virtue of user actions correspondingly occurring in the real world. For instance, the physical act of walking will cause a change in physical location of the MCP 12 and surrounding areas within the user's immediate vicinity. FIGS. 3A and 3B are diagrams respectively showing, by way of example, a virtual object 41 as rendered relative to a real world object 46. A change to the virtual reality rendering occurs by virtue of execution of an action whenever an identification tag 18 on a physical object 19 or stationary place 28 and the physical location information 14 coincide with an identification tag and physical location entries pairing in the actions database. Referring first to FIG. 3A, a virtual object 41, here, a grail, is rendered in an augmented virtual reality 40 based on an identification tag 18 placed on a physical object 19.

Taken in the abstract, the virtual object 41 exists without any other encumbrance to the rendered visualization within the augmented virtual reality 40. However, physical real world objects may be present in the immediate real world environment that block, obscure, or otherwise interfere with clear viewing of the virtual object 41. Referring next to FIG. 3B, the virtual object 41 is rendered relative to a real world object 46, here, a building, that exists in the immediate physical environment 45 of the user. As the real world object 46 is physically between the user and the physical object 19, which triggered rendering of the virtual object 41, the view of the rendered virtual object 41 is effectively blocked by the real world object 46.

Each real world object 46 is represented in the locations database as a three-dimensional model. Each real world object 46 represents a stationary object, such as a building, bridge, monument, wall, or other structure; a fixture, such as a telephone pole, traffic light, or manhole cover; or other physical object that exists independently of the user and the augmented virtual reality in the real world. In one embodiment, the real world objects 46 are described as three-dimensional models that are generated using a three-dimensional modeling program, such as SketchUp application, licensed by Google Inc., Mountain View, Calif., although other three-dimensional modeling programs could also be used. The SketchUp application allows end users to create three-dimensional models, which can be uploaded into an online database, known as the Google 3D Warehouse, for retrieval and viewing by other users. The three-dimensional models can be specified using the .kmz or other standardized file formats. Additionally, the three-dimensional models can be integrated into the Google Earth Website, also licensed by Google, Inc., which presents each model as geolocationally positioned in an online representation of the earth that includes increasing levels of detail, from country borders, to cities, to streets and natural terrain, and finally to individual buildings and other structures and land features.

The combined records in each actions database and locations database can be part of a virtual reality storyline or theme, or be provided as discrete sets of actions untied to a particular scenario. Each identification number can be used one or more times in association with different actions and physical locations.

The physical location entries 33 include geolocational or other locational data representations. The physical location 33 entries can be in a format distinct yet translatable from the format used to express physical location information 14 of the MCP 12. The models uploaded into the Google 3D Warehouse can include geolocational information that specifies the physical position of the corresponding real world object modeled, which, in turn, can be provided with each record in the locations database for those physical objects present in the scenario.

Figure 4:
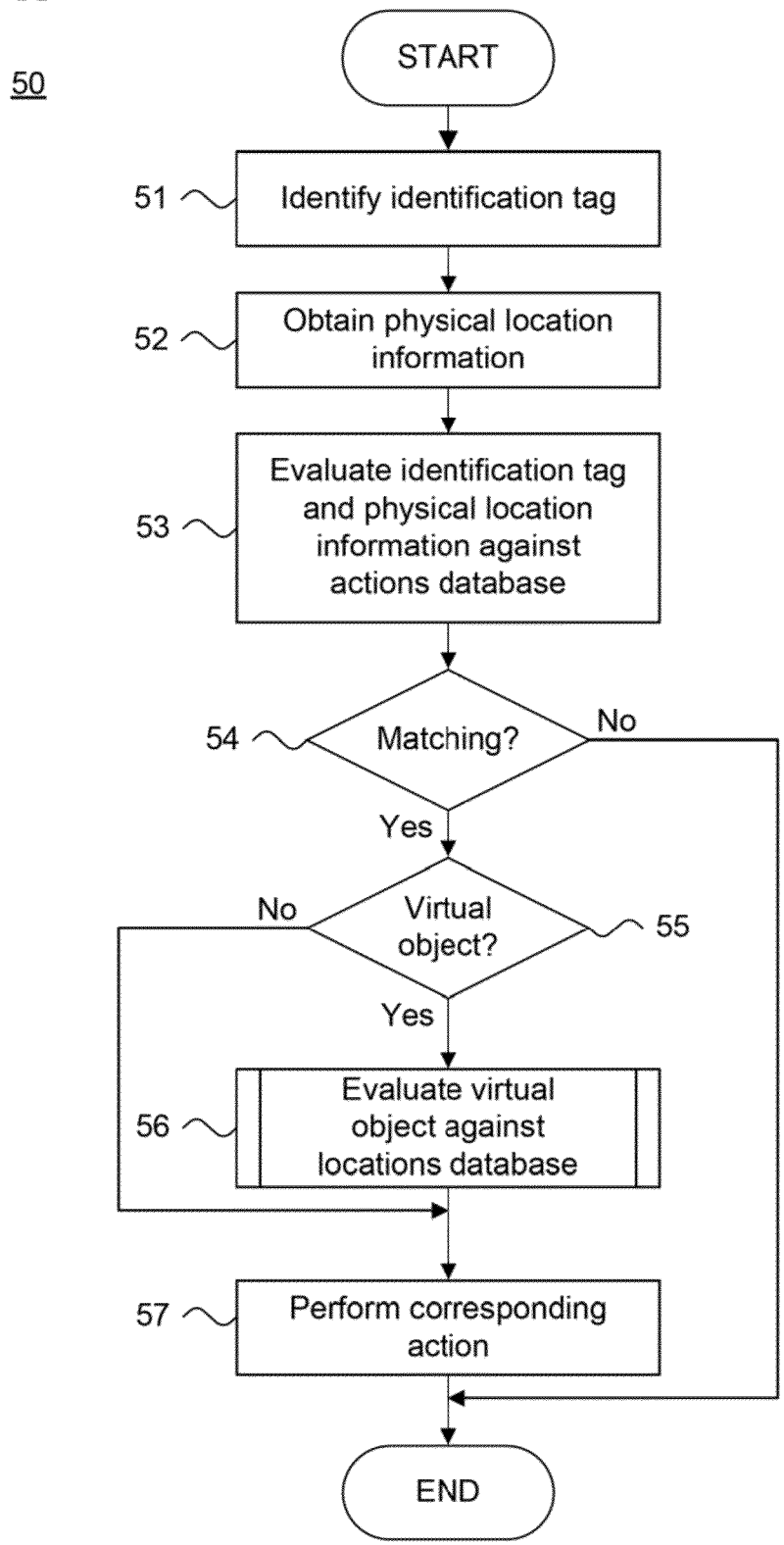
FIG. 4 is a process flow diagram showing a method for simulating placement of a virtual object relative to real world objects in accordance with one embodiment.

Each MCP 12 enables a user to use a physical location or position determined using a GPS receiver or similar means to trigger an action when a tag-identified physical object is encountered and recognized, and any virtual object generated through the action is rendered correctly in relation to real world objects situated within the immediacy of the user. FIG. 4 is a process flow diagram showing a method 50 for simulating placement of a virtual object relative to real world objects in accordance with one embodiment. The method 50 is executed by the MCP 12 and, where applicable, by affiliated hardware or devices functionally coupled to the MCP 12.

Initially, a user operates the MCP 12 in a machine portable, that is, non-stationary, manner. The user can be in motion, for example, during activities including a treasure hunt game, guided tour, or walk, or may be momentarily still, such as stopped to pick up an object. Other types of activities are possible. The activities can occur on foot or by means of conveyance, for instance, during travel by vehicle, airplane, train, or boat. The user can encounter one or more identification tags 18 or similar data markers during the activity, which are read and identified by the MCP 12 (step 51). In a further embodiment, the identification tag 18 can be manually input by the user through the MCP's user interface. Concurrently, the MCP 12 self-identifies its own location (step 52) using, for instance, GPS signals received from the GPS satellites to obtain geolocational data describing the physical location information 14. In a further embodiment, the physical location information 14 can be manually input by the user through the MCP's user interface. The MCP 12 pairs the identification tag 18 and the physical location information 14, which are collectively evaluated against the associations of pairings of physical location 33 and identification tag 32 entries in the actions database (step 53). If a matching of the collected and the stored locational and tag information is made (step 54), one or more associated action 31 entries are retrieved. If any of the retrieved actions include the rendering of at least one virtual object (step 55), each virtual object is evaluated against the locations database (step 56), which ensures correct rendering of the virtual object in light of any real world objects located within the immediate vicinity of the user, as further described below with reference to FIG. 5. The corresponding action is performed (step 57). Additionally, actions associated with predetermined geolocational data and data markers that fall within a particular boundary of the received geolocational data can also be identified. A single action, or a sequence of actions, may be performed. The method 50 is repeated for each identification tag 18 encountered.

Figure 5:
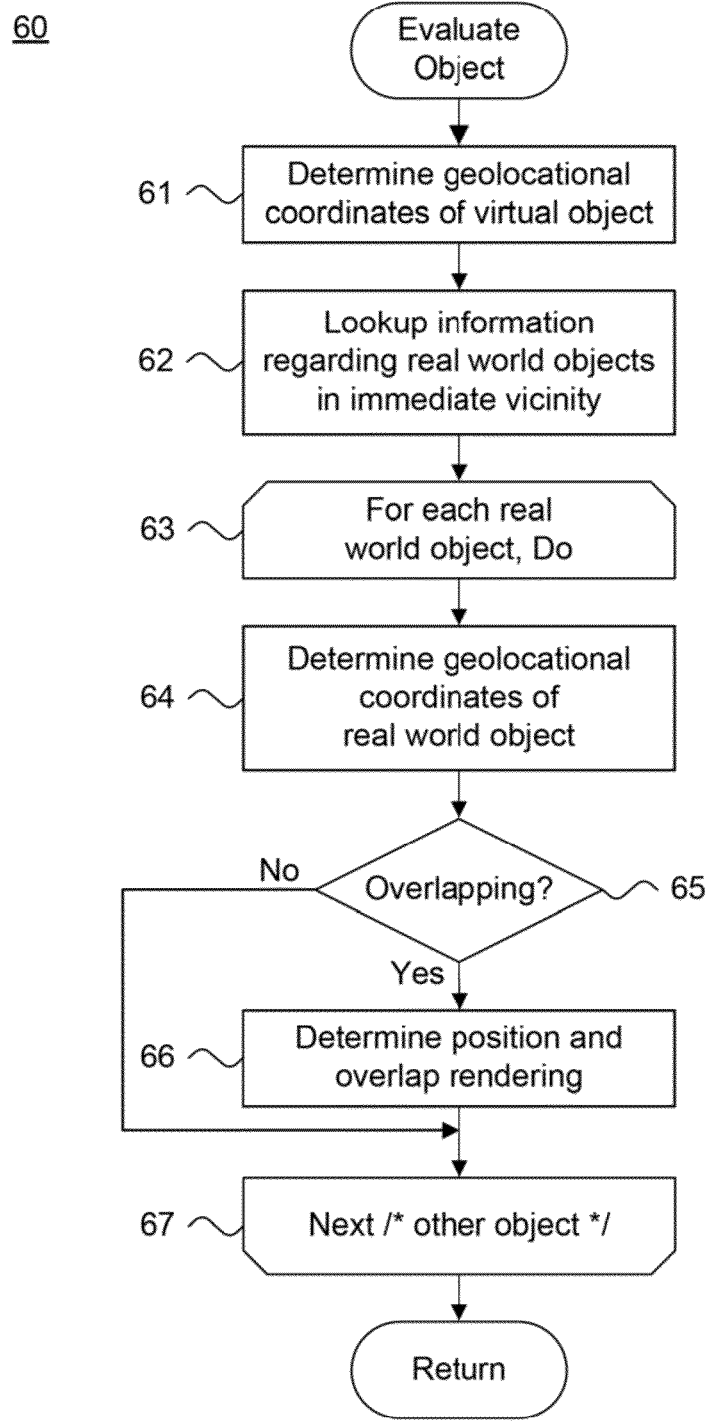
FIG. 5 is a process flow diagram showing a routine for evaluating a virtual object for use in the method of FIG. 4.

Virtual objects are fictitious artifacts of an augmented virtual reality, whereas physical objects exist in the real world and can potentially impact the rendering, and hence believability, of virtual objects. FIG. 5 is a process flow diagram showing a routine 60 for evaluating a virtual object for use in the method 50 of FIG. 4. Based on the location 14 (shown in FIG. 1) of the MCP 12, the geolocational coordinates of the virtual object 41 is determined (step 61). Information regarding any real world objects 46 located in the immediate vicinity of the MCP 12 is obtained (step 62), such as by defining a physical perimeter surrounding the user and identifying those physical objects stored in the locations database that fall within the perimeter. Each of the real world objects 46 are then processed (steps 63-67), as follows (step 63). First, the geolocational coordinates of the real world object 46 are determined (step 64), for instance, by retrieving geolocational data stored with the real world object record in the locations database, or by performing an automated online search. If the virtual object 41 overlaps the real world object 46 (step 65), the position and overlap of the virtual object 41 and the real world object 46 are determined, and the rendering is adjusted as appropriate. For instance, a building or wall may completely obstruct a clear view of a virtual object and only the obstruction would be rendered, not the virtual object. Processing continues for each remaining real world object (step 67), after which the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for rendering a virtual object based on real-world locations and tags, comprising:
   an actions database to maintain a set of virtual objects in an actions database on a mobile computing device, each virtual object is associated with predetermined pairings of identifiers and coordinates for one or more physical locations;
   a tracking module to track a physical location of the mobile computing device and to concurrently identify an identification tag within range of the mobile computing device;
   a pairing module to pair the physical location of the mobile computing device and the identification tag;
   a matching module to identify the virtual object with at least one of the predetermined pairings of coordinates and identifiers that match the paired physical location and the identification tag;
   a rendering module to render the virtual object using the mobile computing device based on the matching of the pairings;
   a mapping module to map real world objects on at least one of a real-world graph and map;
   an objects database to maintain a set of real world object models, each real world object model comprising coordinates of each real world object;
   a real world object module to identify the real world object models within a vicinity of the mobile computing device based on each coordinates of each real world object model;
   an overlap determination module to determine whether the matched virtual object overlaps with each identified real world object model;
   an adjustment module to prevent the overlap between the matched virtual object and the identified real world object by adjusting the rendering of the matched virtual object; and
   a processor to execute the modules.

2. A system according to claim 1, further comprising:
   a matching module to match the coordinates of the matched virtual object against each of the coordinates of the real world object model identified within the vicinity of the mobile computing device; and
   an evaluation module to evaluate the overlap between the matched virtual object and the real world object models.

3. A system according to claim 1, wherein the real world object models each comprise a three-dimensional model.

4. A system according to claim 1, wherein the real world object models each correspond to at least one of a stationary physical object, a physical fixture, and a movable physical object.

5. A system according to claim 1, further comprising:
   an overlap identification module to identify the overlap of the matched virtual object with the real world object models when the real world object model is physically located between the mobile computing device and the matched virtual object.

6. A system according to claim 1, further comprising:
   an application module to execute an application program on the mobile computing device comprising a downloadable cartridge written as an executable script that defines triggerable events; and
   a performance module to perform the triggerable events comprising one or more of displayed text, visualized images or scenes, auditory sounds, and tactile feedback through at least one of the mobile computing device and a device affiliated with the mobile computing device.

7. A system according to claim 1, further comprising:
   a location module to determine the physical location of the mobile computing device through one or more of a global positioning system receiver, a stationary data marker, and a user input.

8. A system according to claim 1, further comprising at least one of:
   a passive identification tag to passively determine the identification tag, wherein the passive identification tag comprises at least one of a bar code, a grid, an image tag, and a sequence that is one or more of alphabetic order, numeric order, symbolic order, and combinations thereof; and
   an active identification tag to actively determine the identification tag, wherein the active identification tag comprises at least one of a wireless transmitter and a radio frequency identification tag.

9. A computer-implemented method for rendering a virtual object based on real world locations and tags, comprising:
   maintaining a set of virtual objects in an actions database on a mobile computing device, each virtual object is associated with predetermined pairings of identifiers and coordinates for one or more physical locations;
   tracking a physical location of the mobile computing device and concurrently identifying an identification tag within range of the mobile computing device;
   pairing the physical location of the mobile computing device and the identification tag;
   identifying the virtual object with at least one of the predetermined pairings of coordinates and identifiers that match the paired physical location and the identification tag;
   rendering the virtual object using the mobile computing device based on the matching of the pairings;
   mapping real world objects on at least one of a real-world graph and map;
   maintaining a set of real world object models in an objects database, each real world object model comprising coordinates of each real world object;
   identifying the real world object models within a vicinity of the mobile computing device based on each coordinates of each real world object model;
   determining whether the matched virtual object overlaps with each identified real world object model; and
   preventing the overlap between the matched virtual object and the identified real world object by adjusting the rendering of the matched virtual object.

10. A method according to claim 9, further comprising:
    matching the coordinates of the matched virtual object against each of the coordinates of the real world object model identified within the vicinity of the mobile computing device; and
    evaluating the overlap between the matched virtual object and the real world object models.

11. A method according to claim 9, wherein the real world object models each comprise a three-dimensional model.

12. A method according to claim 9, wherein the real world object models each correspond to at least one of a stationary physical object, a physical fixture, and a movable physical object.

13. A method according to claim 9, further comprising:
    identifying the overlap of the matched virtual object with the real world object models when the real world object model is physically located between the mobile computing device and the matched virtual object.

14. A method according to claim 9, further comprising:
    executing an application program on the mobile computing device comprising a downloadable cartridge written as an executable script that defines triggerable events; and
    performing the triggerable events comprising one or more of displayed text, visualized images or scenes, auditory sounds, and tactile feedback through at least one of the mobile computing device and a device affiliated with the mobile computing device.

15. A method according to claim 9, further comprising:
    determining the physical location of the mobile computing device through one or more of a global positioning system receiver, a stationary data marker, and a user input.

16. A method according to claim 9, further comprising one of:
    passively determining the identification tag as a passive identification tag, wherein the passive identification tag comprises at least one of a bar code, a grid, an image tag, and a sequence that is one or more of alphabetic order, numeric order, symbolic order, and combinations thereof; and
    actively determining the identification tag as an active identification tag, wherein the active identification tag comprises at least one of a wireless transmitter and a radio frequency identification tag.

17. A non-transitory computer readable storage medium storing code for executing on a computer system to perform the method according to claim 9.

18. A computer-implemented method for performing an augmented reality scenario with a virtual object rendering based on real world locations and tags, comprising:
    defining a scenario, comprising:
       placing an identifier at a plurality of physical locations; and
       defining virtual objects associated with predetermined pairings of the identifiers and coordinates for one or more of physical locations;
    assembling all of the virtual objects into an actions database; and
    performing the scenario through a mobile computing device, comprising:
       tracking a physical location of the mobile computing device and concurrently identifying an identification tag within range of the mobile computing device;
       pairing the physical location of the mobile computing device and the identification tag;
       identifying one such virtual object with at least one of the predetermined pairings of coordinates and identifiers that match the paired physical location and identification tag;
       rendering the virtual object using the mobile computing device based on the matching of the pairings;
       mapping real world objects on at least one of a real-world graph and map;
       maintaining a set of real world object models in an objects database, each real world object model comprising coordinates of each real world object;

identifying the real world object models within a vicinity of the mobile computing device based on each coordinates of each real world object model;
determining whether the matched virtual object overlaps with each identified real world object model; and
preventing the overlap between the matched virtual object and the identified real world object by adjusting the rendering of the matched virtual object.

* * * * *